(12) United States Patent
Mathis

(10) Patent No.: US 6,610,163 B1
(45) Date of Patent: Aug. 26, 2003

(54) ENHANCED BARRIER FILM AND LAMINATE AND METHOD FOR PRODUCING SAME

(75) Inventor: Michael P. Mathis, Marietta, GA (US)

(73) Assignee: Kimberly-Clark Worldwide, Inc., Neenah, WI (US)

(*) Notice: Subject to any disclaimer, the term of this patent is extended or adjusted under 35 U.S.C. 154(b) by 0 days.

(21) Appl. No.: 09/210,323

(22) Filed: Dec. 11, 1998

Related U.S. Application Data

(60) Provisional application No. 60/069,946, filed on Dec. 17, 1997.

(51) Int. Cl.$^7$ ............................ B32B 27/00; B29C 55/00
(52) U.S. Cl. ............... 156/229; 156/244.11; 264/518; 442/394; 442/400
(58) Field of Search ................... 156/229, 250, 156/269, 271, 244.11, 244.18, 244.19; 264/518, 510, 237, 500; 428/224, 225; 442/394, 400

(56) References Cited

U.S. PATENT DOCUMENTS

| | | | |
|---|---|---|---|
| 3,340,122 A | * | 9/1967 | Hofer ........................ 156/244 |
| 3,802,817 A | | 4/1974 | Matsuki et al. |
| 3,844,865 A | | 10/1974 | Elton et al. |
| 3,871,947 A | * | 3/1975 | Brekken .................... 161/116 |
| 4,340,563 A | | 7/1982 | Appel et al. |
| 4,766,029 A | | 8/1988 | Brock et al. |
| 4,789,699 A | | 12/1988 | Kieffer et al. |
| 4,818,597 A | | 4/1989 | DaPonte et al. |
| 4,820,471 A | | 4/1989 | van der Molen |
| 4,822,350 A | * | 4/1989 | Ito et al. .................... 604/372 |
| 4,828,556 A | | 5/1989 | Braun et al. |
| 4,863,785 A | | 9/1989 | Berman et al. |
| 4,877,679 A | | 10/1989 | Leatherman et al. |
| 4,929,303 A | * | 5/1990 | Sheth ......................... 156/209 |
| 4,975,469 A | * | 12/1990 | Jacoby et al. ............. 521/84.1 |
| 5,064,893 A | | 11/1991 | Hoenigmann |
| 5,169,712 A | | 12/1992 | Tapp |
| 5,208,098 A | | 5/1993 | Stover |
| 5,294,482 A | | 3/1994 | Gessner |
| 5,298,202 A | | 3/1994 | Schirmer |
| 5,308,691 A | | 5/1994 | Lim et al. |
| 5,368,927 A | | 11/1994 | Lesca et al. |
| 5,382,400 A | | 1/1995 | Pike et al. |
| 5,409,761 A | | 4/1995 | Langley |
| 5,484,645 A | | 1/1996 | Lickfield et al. |
| 5,560,974 A | | 10/1996 | Langley |
| 5,589,258 A | * | 12/1996 | Maddern et al. ............ 442/382 |
| 5,702,798 A | * | 12/1997 | Sugita et al. ............... 428/131 |
| 5,789,042 A | * | 8/1998 | Jester et al. ................... 428/1 |
| 5,804,020 A | * | 9/1998 | Akao et al. ................. 156/251 |
| 5,853,638 A | * | 12/1998 | Han ........................... 264/154 |
| 5,883,028 A | * | 3/1999 | Morman et al. ............ 442/394 |
| 6,433,047 B2 | * | 8/2002 | Nakamura et al. .......... 524/108 |

FOREIGN PATENT DOCUMENTS

| | | | |
|---|---|---|---|
| DE | 197 01 244 A1 | 7/1998 | |
| EP | 0 854 164 A1 | 12/1997 | |
| JP | 04249132 A | * 9/1992 | ........... B29C/55/28 |
| WO | 309 073 | 3/1989 | |

* cited by examiner

Primary Examiner—Richard Crispino
Assistant Examiner—Sue A. Purvis
(74) Attorney, Agent, or Firm—Pauley Petersen Kinne & Erickson

(57) ABSTRACT

A breathable barrier film laminate having a microporous multilayer film formed by extruding a polymer loaded with a filler having a particle size suitable for pore formation, hot blowing the extruded film, forming a hot blown film bubble, collapsing the hot blown film bubble, forming a multilayer film and stretching the multilayer film, forming a plurality of micropores, and a nonwoven web material layer bonded to at least one surface of the microporous multilayer film. The breathable barrier film laminate is particularly suitable for use in protective apparel such as surgical gowns, surgical drapes, and coveralls.

18 Claims, 2 Drawing Sheets

ENHANCED BARRIER FILM AND LAMINATE AND METHOD FOR PRODUCING SAME

This application claims benefit of U.S. Provisional Application No. 60/069,946, filed Dec. 17, 1997.

FIELD OF THE INVENTION

This invention is related to a breathable multi-ply barrier film and a breathable barrier film laminate comprising said breathable multi-ply barrier film and a nonwoven web. The laminate is particularly useful as an outer cover for disposable diapers and other disposable personal care products, and for breathable surgical gowns, surgical drapes, coveralls, and other breathable protective apparel. In addition, this invention is directed to a method for producing the breathable multi-ply barrier film and laminate.

BACKGROUND OF THE INVENTION

The present invention is directed to breathable barrier films and laminates of breathable barrier films and nonwoven materials. Such laminates have a wide variety of uses, particularly in the areas of limited use and disposable items.

Films have been traditionally used to provide barrier properties in limited use or disposable items. By limited use or disposable, I mean that the product and/or component is used only a small number of times, or possibly only once, before being discarded. Examples of such products include, but are not limited to, surgical and healthcare related products such as surgical drapes and gowns, disposable work wear such as coveralls and lab coats, and personal care absorbent products such as diapers, training pants, incontinence garments, sanitary napkins, bandages, wipes and the like.

In protective apparel, such as hospital gowns, films are used to prevent cross exchange of microorganisms between the wearer and the patient. Although these films are generally effective barriers with respect to water vapor and the like, they are not aesthetically pleasing because their surfaces are smooth and either feel slick or tacky, and they are visually unappealing, making them less desirable in apparel applications and other uses where they are in contact with human skin. Thus, it is desirable that these items be more cloth-like, both from a tactile and visual standpoint. For example, garment-like isolation gowns for use in hospital environments most likely would increase the comfort of the wearer while reducing the apprehensiveness of the patient.

A primary purpose of the film in such laminates is to provide barrier properties. However, there is also a need that such laminates be breathable so that they can transmit water vapor which, in turn, requires that the film be breathable. Apparel made from laminates of breathable or microporous films are more comfortable to wear because they reduce the water vapor concentration and the consequent skin hydration underneath the apparel item. Breathable films and a method for producing such films are taught, for example, by U.S. Pat. No. 3,844,865; and breathable laminates employing porous films and nonwoven materials are taught by U.S. Pat. No. 5,560,974 and U.S. Pat. No. 5,169,712.

In order to be suitable for use in surgical garment applications, as well as other protective apparel, suitable barrier film laminates must meet the requirements of ASTM Standard F-1670 and ASTM Standard F-1671, which standard test methods provide a basis for assessing the effectiveness of materials used in protective clothing for protecting the wearer against contact with body fluids that potentially contain blood-borne pathogens. Conventional film laminates comprise a single layer of microporous film and, as such, defects and/or microscopic holes in the film layer caused by film imperfections frequently cause failure of the laminate to satisfy the requirements of ASTM barrier performance.

SUMMARY OF THE INVENTION

In known processes for forming a nonwoven web/film and/or nonwoven web/film/nonwoven web laminate using heavily loaded film, film containing a filler, such as calcium carbonate ($CaCO_3$) particles, is stretched and thinned so as to render it moisture vapor permeable. However, bonding of the nonwoven web to the film sometimes produces small holes not visible to the naked eye due to imperfections in the film. These small film holes lead to a failure of the material to pass the ASTM tests for barrier performance.

Accordingly, it is one object of this invention to provide a method for producing breathable barrier film laminates which reduces or eliminates failures caused by these film imperfections.

It is a further object of this invention to provide an inexpensive laminate for use in surgical drapes and gowns, and various other protective apparel that has a soft outer cover and breathability properties.

These and other objects of this invention are achieved by a method for producing a moisture vapor permeable multi-ply film in which a polymer suitable for use as a polymeric film and comprising a filler having a particle size suitable for pore formation is extruded to form an extruded film. The extruded film is hot blown, resulting in formation of a hot blown film bubble. The hot blown film bubble is collapsed and trimmed, forming a multilayer film, after which the multilayer film is stretched, forming a plurality of micropores in both layers of the multilayer film. To form the breathable barrier film laminate of this invention, the stretched, microporous, multilayer film is bonded to a nonwoven web layer, forming a nonwoven/film laminate. Because the barrier film of this invention is a multilayer film, the probability of an imperfection in any one area of one layer of the film aligning with an imperfection in the other layer of the film is greatly reduced or eliminated, thereby substantially increasing the probability that the material produced in accordance with the method of this invention will meet ASTM test requirements.

In accordance with one preferred embodiment of this invention, the multilayer film is stretched to a length in the range of about 350 to 500% of its initial length. The resulting film has a water vapor transmission rate (WVTR) in the range of about 1200 grams per square meter per 24 hours ($g/m^2/24$ hours) (measured by ASTM Standard Test E96-80 with CELGARD® 2500 as control).

Laminates of this invention have a wide variety of uses including, but not limited to, items such as surgical drapes and gowns, as well as various articles of clothing, either the entire article or simply as a component thereof.

BRIEF DESCRIPTION OF THE DRAWINGS

These and other objects and features of this invention will be better understood from the following detailed description taken in conjunction with the drawings wherein.

DEFINITIONS

Figure 1:
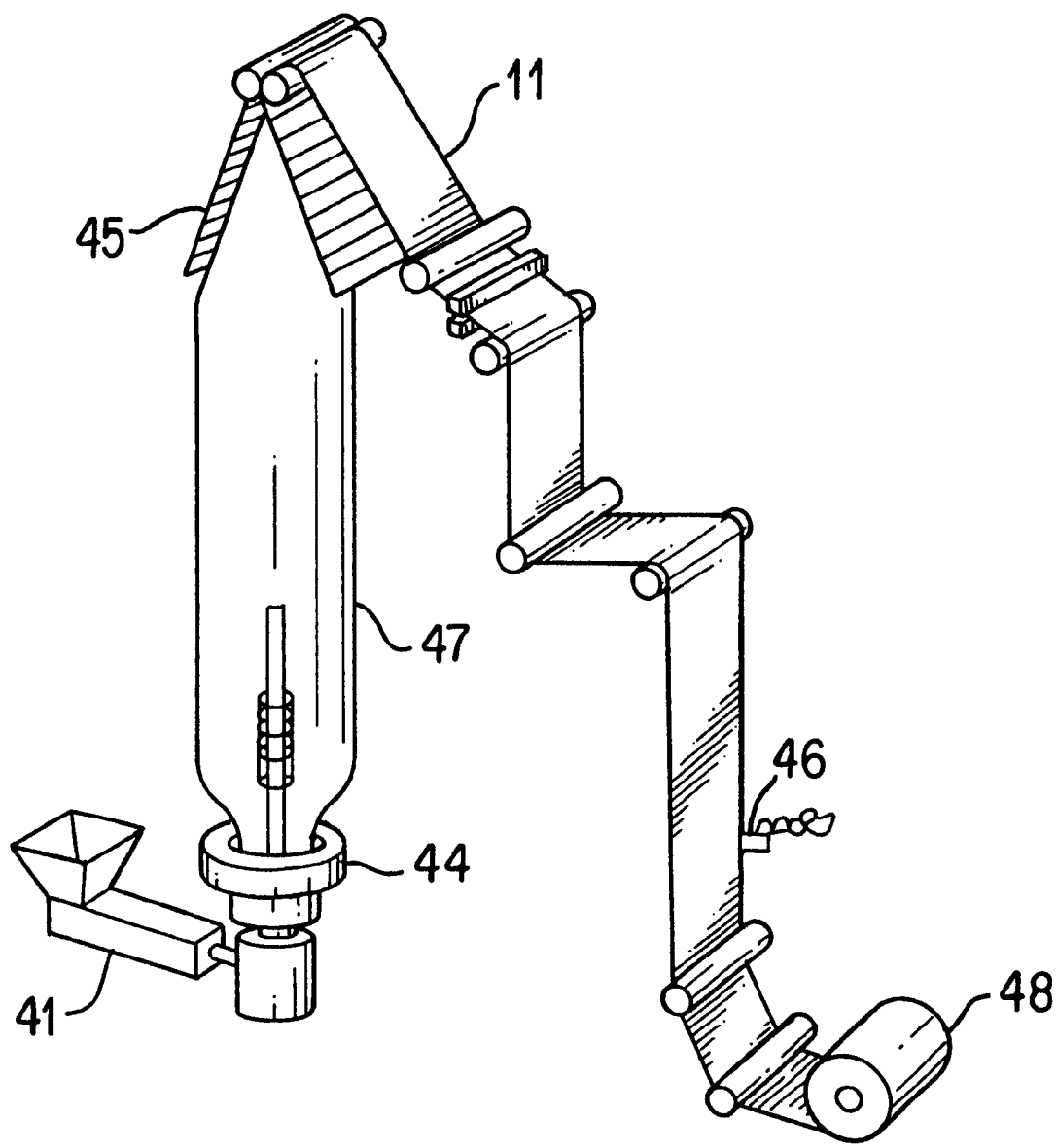
FIG. 1 is a schematic diagram of a hot blown process for producing a multiply film.

As used herein, the term "breathable" refers to a film or laminate having a water vapor transmission rate (WVTR) of at least about 300 g/m$^2$/24 hours measured using ASTM Standard E96-80, upright cup method, with minor variations as described in the Test Procedure below.

As used herein, the term "nonwoven web" means a web that has a structure of individual fibers or threads which are interlaid, but not in an identifiable, repeating manner. Nonwoven webs have been, in the past, formed by a variety of processes such as, for example, meltblowing processes, spunbonding processes, and bonded carded web processes.

As used herein, the term "spunbonded fibers" refers to small diameter fibers which are formed by extruding a molten thermoplastic material as filaments from a plurality of fine, usually circular, capillaries of a spinnerette with the diameter of the extruded filaments then being rapidly reduced as by, for example, eductive drawing or well-known spunbonding mechanisms.

As used herein, the term "spunbond web" refers to a nonwoven web of spunbonded fibers. Methods for producing spunbond webs are taught, for example, by U.S. Pat. No. 3,802,817 to Matsuki et al., U.S. Pat. No. 4,340,563 to Appel et al., and U.S. Pat. No. 5,382,400 to Pike et al., all of which are incorporated herein by reference.

As used herein, the term "polymer" generally includes, but is not limited to, homopolymers, copolymers, such as for example, block, graft, random and alternating copolymers, terpolymers, etc., and blends and modifications thereof. Furthermore, unless otherwise specifically limited, the term "polymer" includes all possible geometric configurations of the material. These configurations include, but are not limited to, isotactic, syndiotactic, and random symmetries.

As used herein, the term "consisting essentially of" does not exclude the presence of additional materials which do not significantly affect the desired characteristics of a given composition or product. Exemplary materials of this sort would include, without limitation, pigments, antioxidants, stabilizers, surfactants, waxes, flow promoters, solvents, particulates, and materials added to enhance processability of the composition.

TEST PROCEDURE FOR MEASURING WATER VAPOR TRANSMISSION RATE (WVTR)

A measure of the breathability of a fabric is the water vapor transmission rate (WVTR) which, for sample materials, is calculated essentially in accordance with ASTM Standard E96-80 with minor variations in test procedure as set forth hereinbelow. Circular samples measuring 3 inches in diameter are cut from each of the test materials, and tested along with a control, which is a piece of CELGARD® 2500 sheet from Celanese Separation Products of Charlotte, N.C. CELGARD® 2500 sheet is a microporous polypropylene sheet. Three samples are prepared for each material. The test dish is a No. 60-1 Vapometer pan distributed by Thwing-Albert Instrument Company of Philadelphia, Pa. 100 milliliters of water is poured into each Vapometer pan and individual samples of the test materials and control material are placed across the open tops of the individual pans. Screw-on flanges are tightened to form a seal along the edges of the pan, leaving the associated test material or control material exposed to the ambient atmosphere over a 6.5 cm diameter circle having an exposed area of approximately 33.17 cm$^2$. The pans are placed in a forced air oven at 100° F. (32° C.) for one hour to equilibrate. The oven is a constant temperature oven with external air circulating through it to prevent water vapor accumulation inside. A suitable forced air oven is, for example, a Blue MP Power-O-Matic 600 oven distributed by Blue ME Electric Company of Blue Island, Ill. Upon completion of the equilibration, the pans are removed from the oven, weighed and immediately returned to the oven. After 24 hours, the pans are removed from the oven and weighed again. The preliminary test water vapor transmission rate values are calculated as follows:

Test WVTR=(grams weight loss over 24 hours)×315.5 g/m$^2$/24 hours.

The relative humidity within the oven is not specifically controlled.

Under predetermined set conditions of 100° F. (32° C.) and ambient relative humidity, the WVTR for the CELGARD® 2500 control has been defined to be 5000 g/m$^2$ for 24 hours. Accordingly, the control sample was run with each test and the preliminary test values were corrected to set conditions using the following equation:

WVTR=(Test WVTR/control WVTR)×(5000 g/m$^2$/24 hours)

DESCRIPTION OF PREFERRED EMBODIMENTS

This invention is directed to breathable barrier films and to soft, breathable barrier film laminates employing said films. This invention is also related to a method for producing said breathable barrier films and breathable barrier film laminates.

The breathable barrier film of this invention is a moisture vapor permeable multi-ply film produced from a polymer suitable for use as a polymeric film, which polymer is loaded with a filler, preferably an inorganic filler. Preferred polymers suitable for use in this invention are polymers which produce non-elastic films. Such polymers include, but are not limited to, Catalloy available from Himont, Wilmington, Del., flexible polyolefins available from Huntsman Chemical Corporation, Odessa, Tex., random copolymers, linear low density polyethylene, and mixtures thereof.

In addition to the polymeric material, the film layer also comprises a filler which enables development of micropores during stretching of the film. As used throughout the specification and claims, the term "filler" means particulates and other forms of materials which can be added to the polymer and which will not chemically interfere with or adversely affect the extruded film, but which is able to be uniformly dispersed throughout the film. Generally, the fillers will be in particulate form and usually will have somewhat of a spherical shape with average particle sizes in the range of about 0.50 to about 8 microns. In addition, the film will usually contain in the range of about 10 to 50 volume percent filler based upon the total volume of the film layer. In accordance with a particularly preferred embodiment of this invention, the film comprises in the range of about 35% to 40% by volume of said filler material. Both organic and inorganic fillers are suitable for use in this invention provided that they do not interfere with the film formation process, the breathability of the resultant film, or its ability to bond to another layer, such as a fibrous polyolefin nonwoven web.

Examples of suitable fillers include calcium carbonate (CaCO$_3$), various kinds of clay, silica (SiO$_2$), alumina, barium sulfate, sodium carbonate, talc, magnesium sulfate, titanium dioxide, zeolites, aluminum sulfate, cellulose-type powders, diatomaceous earth, magnesium carbonate, barium carbonate, kaolin, mica, carbon, calcium oxide, magnesium oxide, aluminum hydroxide, pulp powder, wood powder, cellulose derivatives, polymer particles, chitin and chitin derivatives.

As previously stated, the breathable barrier film of this invention is a moisture vapor permeable multi-ply film. This moisture vapor permeable multi-ply film is produced by extruding a polymer comprising a filler having a particle size suitable for pore formation. Average particle size of the filler is preferably in the range of about 0.5 microns to about 8.0 microns and more preferably in the range of about 0.7 microns to 1.0 microns. The extruded film is hot blown so as to form a hot blown film bubble. The hot blown film bubble is then collapsed and the edges trimmed, forming a multilayer film. The multilayer film is then stretched, resulting in formation of a plurality of micropores in the multilayer film.

Generally, in order to make the multi-ply film breathable, it is preferably loaded with calcium carbonate particles and stretched in the range of about 3.5 to about 5.0 times its initial length once in the machine direction to make it microporous. The typical gauge of each ply of pre-stretched film is 1.5 mil. After stretching, the multi-ply film preferably has a total film gauge of about 0.8 mils. The stretched multilayer film preferably has a WVTR in the range of about 1200 $g/m^2/24$ hours to about 4500 $g/m^2/24$ hours. The particle size of the filler material is such that upon stretching of the polymeric film, micropores having an average pore size in a range of about 0.05 to about 0.06 microns are produced. The basis weight of the resulting stretched multi-ply film is preferably in the range of about 0.6 to 1.0 ounces per square yard (osy).

Figure 2:
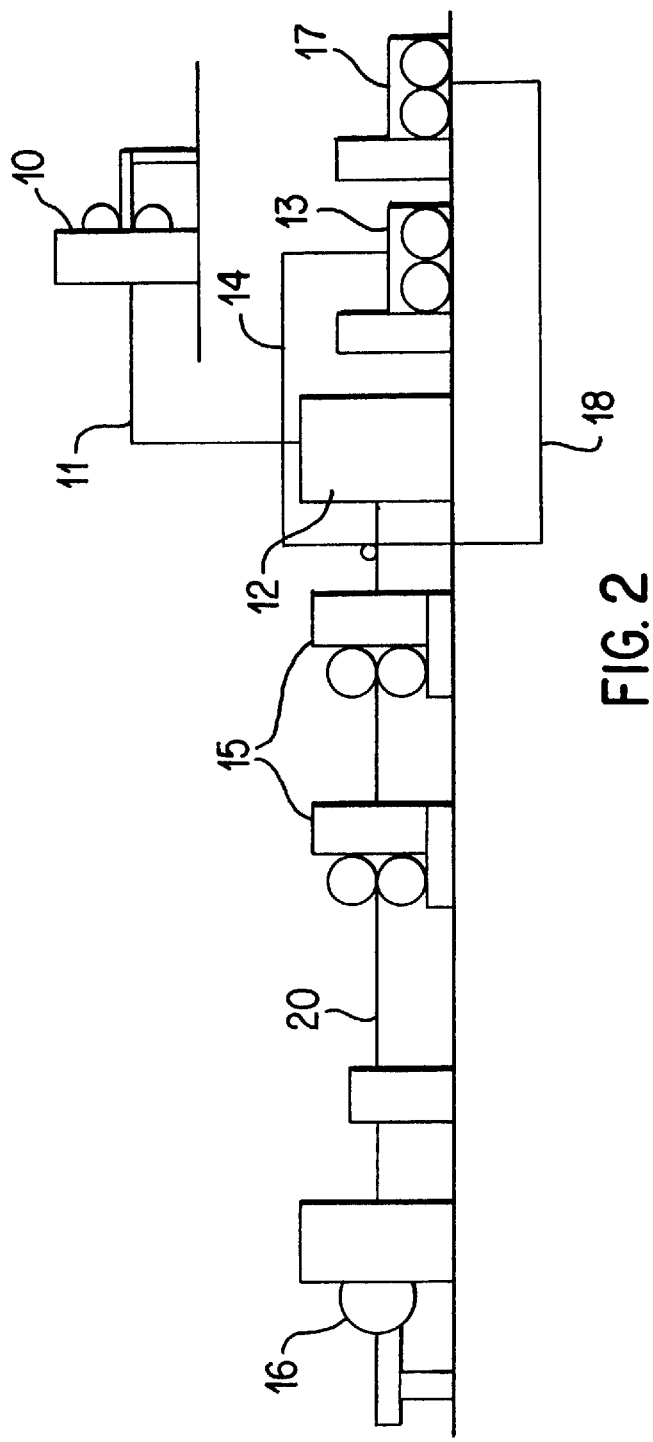
FIG. 2 is a schematic diagram of a process for producing a breathable barrier film laminate in accordance with one embodiment of this invention.

In accordance with one preferred embodiment, the breathable barrier film of this invention is bonded to a nonwoven web material layer, forming a breathable barrier film laminate. In general, a process for forming a breathable barrier film laminate in accordance with this invention is shown in FIGS. 1 and 2. Multilayer filled film 11 is formed from a film extrusion apparatus 40, a blown unit, which includes an extruder 41 (See FIG. 1). From extruder 41, the filled polymeric material is introduced into the blown unit in which it is formed by air blowing through air ring 44 into bubble 47. Bubble 47 is then collapsed on collapsing frame 45 resulting in the formation of multilayer filled film 11. Multilayer filled film 11 is then trimmed by trimmer 46 after which it is wound onto windup 48 to produce a single roll of film which is multilayer.

Figure 3:
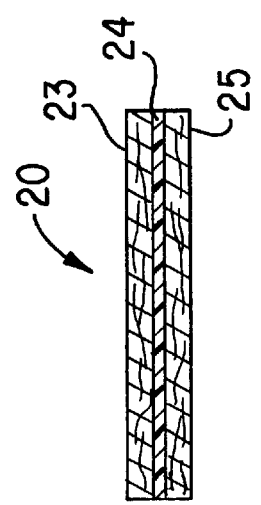
FIG. 3 is a cross-sectional view of a laminate of this invention.

Multilayer filled film 11 is then unwound from film unwind 10 from which it is introduced into a film stretching unit 12, in particular a machine direction orienter, as shown in FIG. 2. Simultaneously therewith, a nonwoven web material layer 14 is unwound from continuous unwind apparatus 13 and applied to one surface of multilayer filled film 11 leaving film stretching unit 12. In accordance with one embodiment of this invention, a second nonwoven web material layer 18 is unwound from a second continuous wind apparatus 17 and applied to the other surface of the stretched multilayer filled film 11 to form a nonwoven web/film/nonwoven web composite. The composite is then passed through bonding calender system 15 resulting in formation of the breathable barrier film laminate 20. Breathable barrier film laminate 20 is then wound onto surface winder 16. Breathable barrier film laminate 20 in accordance with one embodiment of this invention is shown in FIG. 3 and comprises breathable barrier film 24 sandwiched between nonwoven web material layers 23 and 25.

In accordance with a particularly preferred embodiment of this invention, the nonwoven material web layer of the breathable barrier film laminate is a spunbond material layer. However, other nonwoven materials may also be used as desired for a given application.

The breathable barrier film laminate of this invention is particularly suitable for use in protective apparel including, but not limited to, surgical gowns, coveralls, surgical drapes, and the like. The material of this invention also meets the requirements of ASTM Standard F-1670 and ASTM Standard F-1671 regarding barrier requirements.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

What is claimed is:

1. A method for producing a stretched moisture vapor permeable multi-ply film comprising the steps of:

extruding a polymer comprising a filler having a particle size suitable for pore formation, said polymer suitable for use as a polymeric film;

hot blowing the extruded film, forming a hot blown film bubble;

collapsing said hot blown film bubble, forming a multi-ply film comprising a plurality of film plies; and stretching said plurality of film plies, forming a stretched multi-ply film having a plurality of micropores in each of said film plies, said micropores having an average pore size not greater than about 0.06 microns;

wherein the stretched multi-ply film has a moisture vapor transmission rate of at least about 1200 $grams/m^2$-24 hours and meets the barrier standards defined in ASTM F1670 and ASTM F1671.

2. A method in accordance with claim 1, wherein said filler comprises in a range of about 10% to about 50% by volume of said film.

3. A method in accordance with claim 2, wherein said filler comprises in a range of about 35% to about 40% by volume of said film.

4. A method in accordance with claim 1, wherein said micropores have an average pore size in a range of about 0.05 microns to about 0.06 microns.

5. A method in accordance with claim 1, wherein said filler comprises a plurality of $CaCO_3$ particles.

6. A method in accordance with claim 1, wherein said particle size of said filler is in a range of about 0.5 microns to about 8.0 microns.

7. A method in accordance with claim 6, wherein said particle size of said filler is in a range of about 0.7 microns to about 1.0 microns.

8. A method in accordance with claim 1, wherein said stretching of said film is in a machine direction.

9. A method in accordance with claim 1, wherein said film is stretched at a stretch ratio in a range of about 3.5:1 to about 5.0:1.

10. A method in accordance with claim 1, wherein a total film gauge of said stretched film is about 0.8 mils.

11. A method in accordance with claim 1, wherein said stretched film has a WVTR in a range of about 1200 $g/m^2/24$ hours to about 4500 $g/m^2/24$ hours.

12. A method in accordance with claim 1, wherein said stretched film is bonded to a nonwoven web material layer, forming a nonwoven/film laminate.

13. A method in accordance with claim 12, wherein said nonwoven web material layer is comprises a spunbond web.

14. A method in accordance with claim 1, wherein said stretched film is bonded to two nonwoven web material layers, forming a nonwoven/film/nonwoven laminate.

15. A method in accordance with claim 14, wherein each of said nonwoven web material layers comprises a spunbond web.

16. A method in accordance with claim 1, wherein said polymer comprises linear low-density polyethylene (LLDPE).

17. A method in accordance with claim 1, wherein a basis weight of said stretched film is in a range of about 0.6 osy to about 1.0 osy.

18. A method for producing a stretched moisture vapor permeable multi-ply film comprising the steps of:

extruding a polymer comprising a filler having a particle size suitable for pore formation, said polymer suitable for use as a non-elastic polymeric film;

hot blowing the extruded film, forming a hot blown film bubble;

collapsing said hot blown film bubble, forming a multi-ply film comprising a plurality of film plies; and stretching said plurality of film plies, forming a plurality of micropores in each of said film plies, said micropores having an average pore size not greater than about 0.06 microns;

wherein the stretched multi-ply film has a moisture vapor transmission rate of at least about 1200 grams/m$^2$-24 hours and meets the barrier standards defined in ASTM F1670 and ASTM F1671.

* * * * *